(12) United States Patent
Sasaki

(10) Patent No.: US 8,456,688 B2
(45) Date of Patent: Jun. 4, 2013

(54) DATA GENERATING DEVICE, SCANNER AND NON-TRANSITORY COMPUTER READABLE MEDIUM

(75) Inventor: Hiroyuki Sasaki, Chita (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 792 days.

(21) Appl. No.: 12/569,100

(22) Filed: Sep. 29, 2009

(65) Prior Publication Data

US 2010/0082937 A1    Apr. 1, 2010

(30) Foreign Application Priority Data

Sep. 30, 2008 (JP) ................................. 2008-252479

(51) Int. Cl.
*G06K 15/00* (2006.01)
*G06K 9/00* (2006.01)
*G03F 3/10* (2006.01)

(52) U.S. Cl.
USPC ........................... 358/1.17; 358/527; 382/112

(58) Field of Classification Search
USPC ............... 358/1.17, 1.15, 1.16, 527; 382/112, 382/309; 345/156, 173; 715/700; 707/102, 707/E17.005
See application file for complete search history.

(56) References Cited

U.S. PATENT DOCUMENTS

| 6,940,491 B2 * | 9/2005 | Incertis Carro ............... 345/173 |
| 2005/0238205 A1 * | 10/2005 | Kimura et al. ................. 382/112 |
| 2008/0114757 A1 | 5/2008 | Dejean et al. |
| 2009/0172002 A1 * | 7/2009 | Ahmed ......................... 707/102 |

FOREIGN PATENT DOCUMENTS

| JP | 7-262207 | 10/1995 |
| JP | 2000-181931 | 6/2000 |
| JP | 2002-290644 | 10/2002 |
| JP | 2006-197270 | 7/2006 |
| JP | 2008-123528 | 5/2008 |

OTHER PUBLICATIONS

Suzuki, "Image Processing Device", *Toshiba Technical Review*, Japan, Toshiba Corporation, (Dec. 10, 1998), vol. 16-72, pp. 89-102.

* cited by examiner

*Primary Examiner* — Charlotte M Baker
(74) *Attorney, Agent, or Firm* — Scully, Scott, Murphy & Presser, P.C.

(57) ABSTRACT

A data generating device may comprise a data identifying unit, a number identifying unit and a hyperlink structuring unit. The data identifying unit may identify the data of the contents table page and/or the index page included in data including a contents table page and/or an index page, and data of a plurality of normal pages, each normal page including a page number. The number identifying unit may identify a number included in the data of the contents table page and/or the index page, and identify a specific position at which the identified number is located. The hyperlink structuring unit may generate data of hyperlink structure from the data by generating a hyperlink, at a position corresponding to the specific position of the number identified by the number identifying unit, that links to data of a normal page coinciding with the page number identified by the number identifying unit.

13 Claims, 19 Drawing Sheets

FIG. 8

| Scan Number | Image Data Name | Attribute | Page Number |
|---|---|---|---|
| 0 | 2008.××.××.×× | Contents Table | |
| 1 | 2008.××.××.△△ | Contents Table | |
| 2 | 2008.××.××.○○ | Normal | |
| ⋮ | ⋮ | ⋮ | ⋮ |

FIG. 12

Table of Contents

Chapter1 ○○○○○ .................... 1
    1.1 × × × × × × × ×............ 1
    1.2 × × × × × × × × ×.......... 3
    1.3 × × × × × × × × × ×........ 5

Chapter2 ○○○○○ .................... 6
    2.1 × × × × × × × × ×.......... 6
    2.2 × × × × × × ×............. 9
    2.3 × × × × × × × × × ×........ 10
    2.4 × × × × × × × ×........... 12

Chapter3 ○○○○○ .................... 13
    3.1 × × × × × × × × ×.......... 13
    3.2 × × × × × × ×............. 15
    3.3 × × × × × × × × × ×........ 17
    3.4 × × × × × × × ×........... 21

:
                          :

Chapter9 ○○○○○ .................... 85
    3.1 × × × × × × × ×........... 85
    3.2 × × × × × × × × × ×........ 88
    3.3 × × × × × ×............... 90

200: Table of Contents
202: Chapter 1
204: Chapter 2
206: Chapter 3

FIG. 14

Index

Alphabet

A
Axxxx ········ 36
Axxx ········· 25

B
Bxxx ········· 11
Bxx ·········· 45

C
Cxxx ····· 23, 33, 70
Cxxxx ······· 30, 45

N
Nxxxxx ··· 80, 90, 91
Nxx ········· 40, 44

FIG. 15

| Page Number | Location Information |
|---|---|
| 0 | |
| 1 | |
| 3 | |
| 5 | |
| 6 | |

FIG. 16

| | Identification Rule | Application Example | Contents Table Page | Index Page | Normal Page |
|---|---|---|---|---|---|
| (1) | ①Non-number character present within first length in front of and /or behind number string | ▯13▯ | Not identified as page number | Not identified as page number | Not identified as page number if non-number character is character other than "-" <br> One of Rules (2) to (4) applied if non-number character is "-" |
| (2) | ①Non-number character other than ",", "." included between numbers | 13.5 <br> 13-5 | Not identified as page number | Not identified as page number | Not identified as page number |
| (3) | When rules (1), (2) do not apply and number string includes ",", "." between first number and second number <br> ①Interval between ",", "." and numbers in front of and behind ",", "." within second length <br> ②Interval between numbers in first number within third length <br> ③Interval between numbers in second number within third length | 1,350 | Page number identified as "1350" | Page number identified as "1350" | Page number identified as "1350" |
| | ①Interval between ",", "." and numbers in front of and behind ",", "." exceeds second length <br> ②Interval between numbers in first number within third length <br> ③Interval between numbers in second number within third length | 13.5 | Not identified as page number | Page numbers identified as "13" and "5" | Not identified as page number |

FIG. 17

| Identification Rule | Application Example | Contents Table Page | Index Page | Normal Page |
|---|---|---|---|---|
| (4) When rules (1), (2) do not apply and number string does not include "," | | | | |
| ① Interval between numbers in number string within third length | 1 3 5 | Page number identified as "135" | Page number identified as "135" | Page number identified as "135" |
| ① Interval between numbers in number string is fourth length ② Numbers separated by fourth length have length less than or equal to third length | 1 3  5 | Not identified as page number | Page numbers identified as "13" and "5" | Not identified as page number |
| | 1  3  5 | Not identified as page number | Page numbers identified as "1", "3", "5" | Not identified as page number |

DATA GENERATING DEVICE, SCANNER AND NON-TRANSITORY COMPUTER READABLE MEDIUM

CROSS-REFERENCE TO RELATED APPLICATION

This application claims priority to Japanese Patent Application No. 2008-252479, filed on Sep. 30, 2008, the contents of which are hereby incorporated by reference into the present application.

BACKGROUND

1. Field

The present specification discloses to a technology for generating data of hyperlink structure.

2. Description of the Related Art

A document having a plurality of pages, such as a book, a magazine, or the like may be scanned page by page, and data may be generated for each page. The data for plural pages that has been generated may be stored as a set of data.

In a case where a user searches for specific data for a page in which desired content is recorded from among the set of data, each of the data included in the set must be checked. Further, in recent years, mobile information terminals including mobile phones and notebook computers have become widespread and, accompanying this, it is also often the case that books, business documents, etc. that conventionally had paper-based uses are scanned and converted to data. The opportunities are also increasing for a user to utilize the user's mobile information terminal to browse through data sets generated by scanning books, business documents, etc. In this kind of usage, a technology that allows the documents that have been converted to data to be browsed efficiently is desired.

BRIEF SUMMARY

In the present specification, a technology is presented that allows the user to easily see data corresponding to a desired page.

One technique taught by the present specification is a data generating device. The data generating device may comprise a data identifying unit, a number identifying unit and a hyperlink structuring unit. The data identifying unit may be configured to identify the data of the contents table page and/or the index page included in a set of data including data of a contents table page and/or an index page, and data of a plurality of normal pages, data of each normal page including a page number. The number identifying unit may be configured to identify a number included in the data of the contents table page and/or the index page identified by the data identifying unit, and to identify a specific position at which the identified number is located in the data of the contents table page and/or the index page. The hyperlink structuring unit may be configured to generate data of hyperlink structure from the set of data by generating a hyperlink, at a position corresponding to the specific position of the number identified by the number identifying unit, that links to data of a normal page including a page number that coincides with the number identified by the number identifying unit.

BRIEF DESCRIPTION OF THE DRAWINGS

FIG. 8 shows an example of an image data administration table.
FIG. 12 shows an example of a contents table page.
FIG. 14 shows an example of an index page.
FIG. 15 shows an example of a link information table.
FIG. 16 shows an example of identification rules followed by the CPU.
FIG. 17 shows an example of identification rules followed by the CPU.

DETAILED DESCRIPTION OF THE PREFERRED EMBODIMENTS (Configuration of the Scanner)

Figure 1:
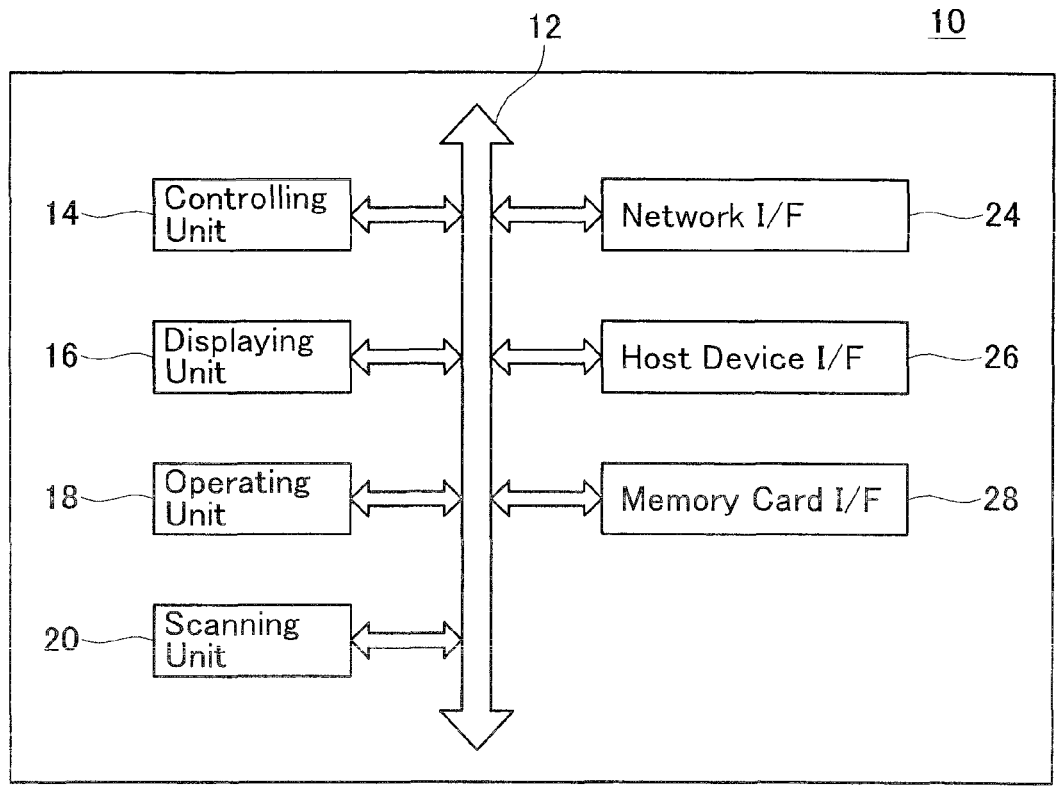
FIG. 1 shows a schematic configuration of a scanner.

The present embodiment will be described with reference to the figures. As shown in FIG. 1, a scanner 10 comprises a controlling unit 14, a displaying unit 16, an operating unit 18, a scanning unit 20, a network interface (termed "network I/F" in FIG. 1 and below) 24, a host device interface (termed "host device I/F" in FIG. 1 and below) 26, and a memory card interface (termed "memory card I/F" in FIG. 1 and below) 28. The unit components of the scanner 10 are connected by a bus 12.

The displaying unit 16 is capable of displaying various types of information. The displaying unit 16 may be, for example, a liquid crystal display panel. The operating unit 18 has a plurality of keys (number keys, start key, cancel key, etc.) to be operated by a user. The user can input various information and commands to the scanner 10 by operating the operating unit 18. The scanning unit 20 reads documents set on the scanning unit 20, and generates image data. The scanning unit 20 is capable of automatically turning the pages of documents (books, magazines, resumes, etc.) set on the scanning unit 20. The scanner 10 can be connected to an external PC or an electronic book reading terminal, etc. via the network I/F 24 and the host device I/F 26. Further, the scanner 10 can be connected to a memory card via the memory card I/F 28.

Figure 2:
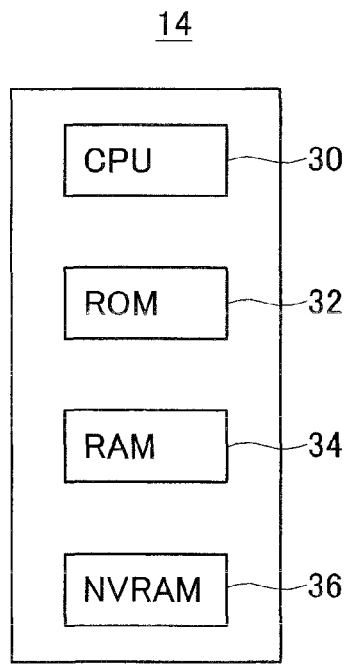
FIG. 2 shows a schematic configuration of a controlling unit.
Figure 3:
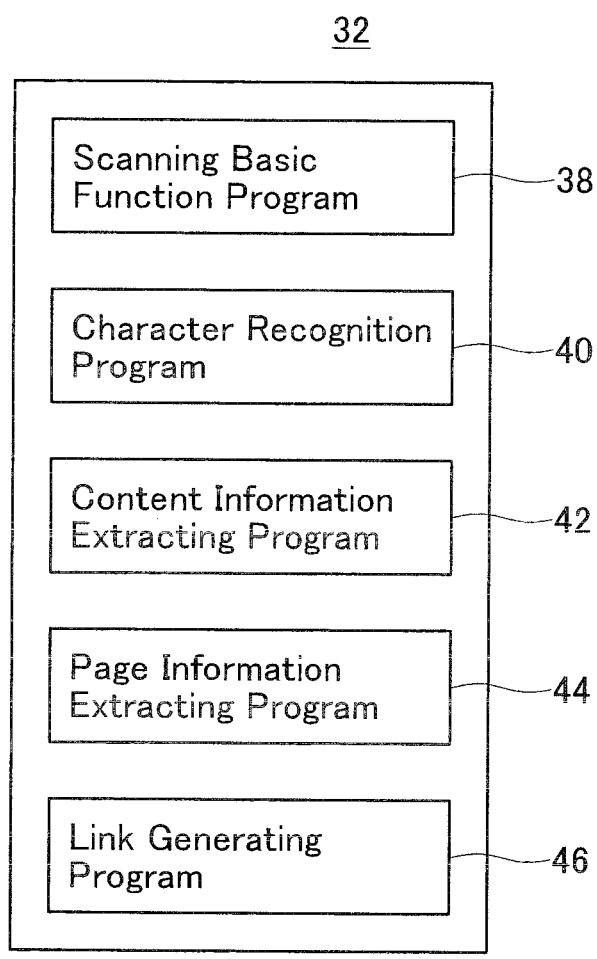
FIG. 3 shows a schematic configuration of a ROM.

As shown in FIG. 2, the controlling unit 14 comprises a CPU 30, a ROM 32, a RAM 34, and an NVRAM 36. The CPU 30 executes various processes according to programs that have been stored in advance in the ROM 32, and exerts unified control over the operation of the scanner 10. As shown in FIG. 3, the ROM 32 stores a scanning basic function program 38, a character recognition program 40, a content information extracting program 42, a page information extracting program 44, and a link generating program 46. The processes executed by the CPU 30 in accordance with the programs stored in the ROM 32 will be described in detail later.

Figure 4:
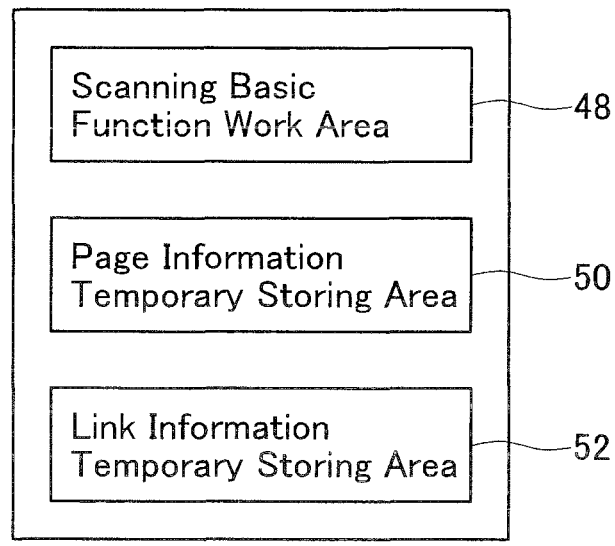
FIG. 4 shows a schematic configuration of a RAM.
Figure 5:
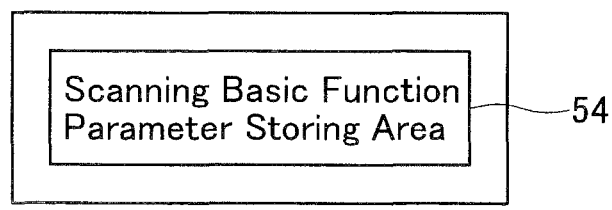
FIG. 5 shows a schematic configuration of an NVRAM.

The CPU 30 stores data, etc. generated during the execution of the processes in the RAM 34. As shown in FIG. 4, the RAM 34 comprises a scanning basic function work area 48, a page information temporary storing area 50, and a link information temporary storing area 52. Contents stored in the areas of the RAM 34 will be described in detail later. As shown in FIG. 5, the NVRAM 36 comprises a scanning basic function parameter storing area 54. The scanning basic function parameter storing area 54 stores the parameters of the basic functions of the scanner 10, such as the resolution of the scanning unit 20, the color (monochrome or color) of the scanning unit 20, etc. By operating the operating unit 18, the user can change the parameters stored in the scanning basic function parameter storing area 54.

(Processes Performed by the CPU)

By operating the operating unit 18, the user can command the scanner 10 to scan documents. In accordance with the scanning basic function program 38 stored in the ROM 32, the CPU 30 displays "normal mode" and "document mode" in the displaying unit 16 so that the user can select between them. The user selects either "normal mode" or "document mode" by operating the operating unit 18. If "normal mode" is selected by the user, the CPU 30 works according to the scanning basic function program 38 stored in the ROM 32 to have the scanning unit 20 read the document set on the scanning unit 20, and generate image data. The CPU 30 sends the generated image data to an external PC or the like via the network I/F 24 or the host device I/F 26. Alternatively, the CPU 30 may store the generated image data in a connected memory card via the memory card I/F 28.

Figure 6:
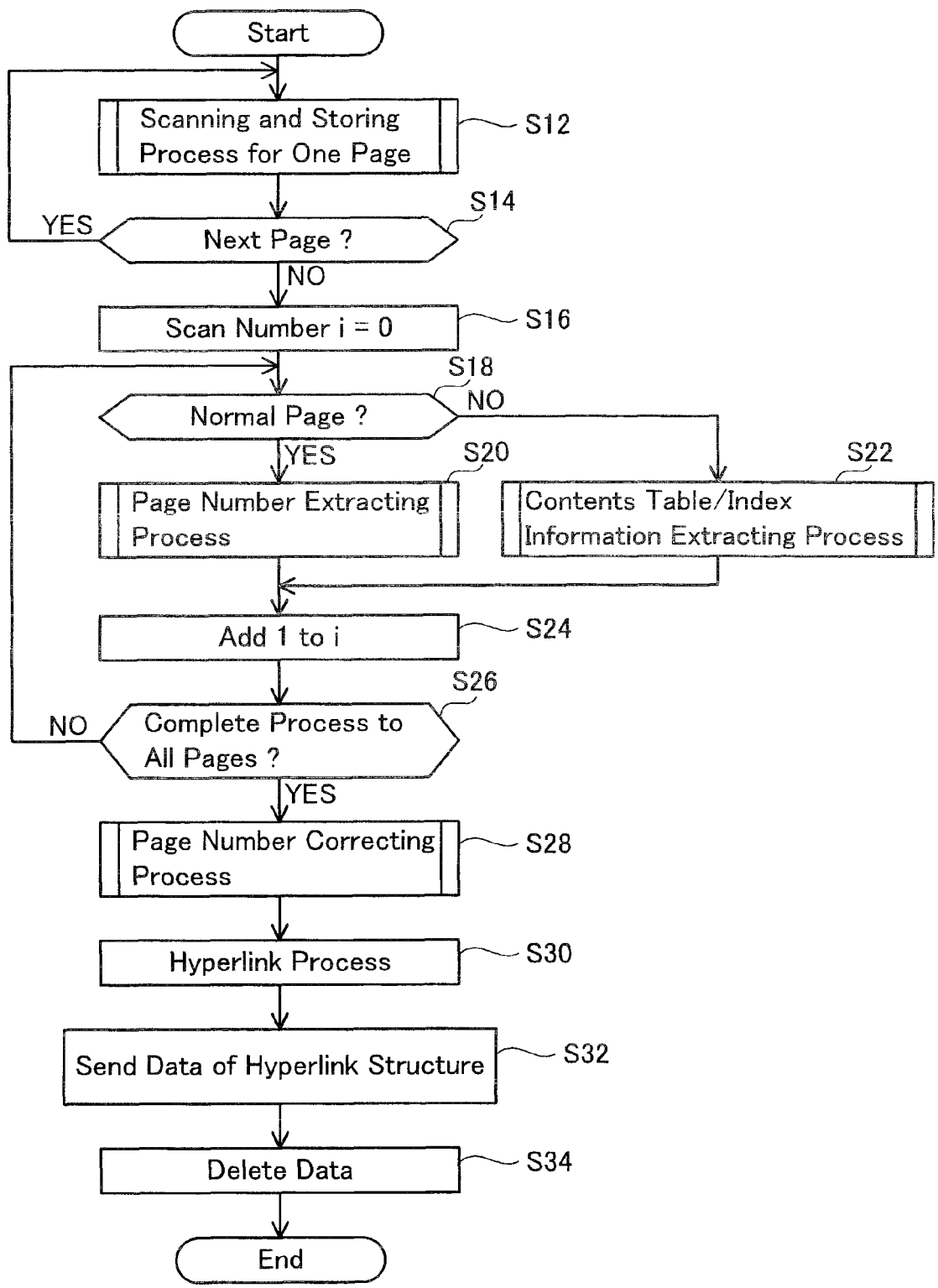
FIG. 6 shows a process executed by a CPU in the case where "document mode" has been selected by a user.

By contrast, the case where "document mode" has been selected by the user will be described below. As shown in FIG. 6, the CPU 30 performs a scanning and storing process for one page in accordance with the scanning basic function program 38 stored in the ROM 32 (S12). The scanning and storing process in this embodiment is performed in a unit of one page. That is, if image data for two pages were to be generated, the scanning and storing process for one page is performed twice. Hence, such a scanning and storing process may hereinafter be referred to as a "page scanning and storing process".

Figure 7:
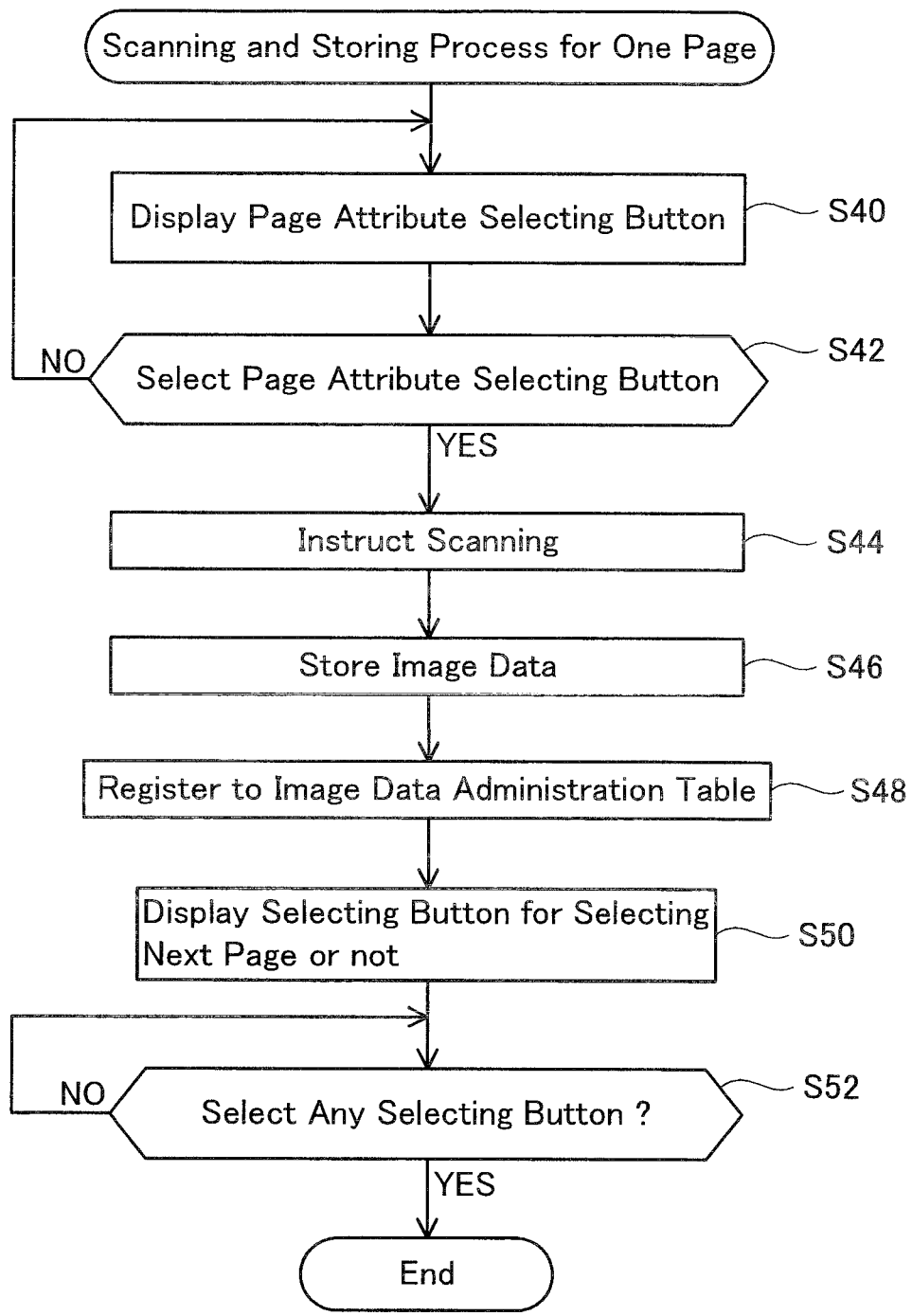
FIG. 7 shows a scanning and storing process for one page executed by the CPU.

As shown in FIG. 7, in the page scanning and storing process, the CPU 30 causes a page attribute selecting buttons including page attribute choices of "contents table", "index", and "normal" to be displayed in the displaying unit 16 so that the user can select the page attribute (S40). The user selects a page attribute selecting button, from among the buttons displayed in the displaying unit 16, that corresponds to the attribute of the page to be scanned. The CPU 30 monitors which page attribute selecting button has been selected by the user (S42). If any page attribute selecting button has been selected by the user (YES in S42), the CPU 30 causes one page of the document set on the scanning unit 20 to be scanned (S44). The CPU 30 stores the one page of image data that was generated by the scanning of the scanning unit 20 in the page information temporary storing area 50 of the RAM 34 (S46). The CPU 30 registers information relating to the generated image data in the page information temporary storing area 50 (S48). The page information temporary storing area 50 can store an image data administration table 60.

As shown in FIG. 8, the image data administration table 60 is capable of recording an association of a scan number 62, an image data name 64, an attribute 66, and a page number 68. After the "document mode" has been selected, the order in which the image data is generated by the scanning unit 20 is recorded as the scan number 62. The scan number proceeds in the sequence "0", "1", and on. The time at which the image data was generated, for example, is recorded as the image data name 64. The page attribute selected by the user in S42 of FIG. 7 is recorded as the attribute 66. The page number of the image data having the page attribute "normal" is recorded as the page number 68. In S48 of FIG. 7, the CPU 30 registers the scan number 62, the image data name 64, and the attribute 66. The page number 68 is registered in a process (S20, etc. of FIG. 6) that is performed later.

The CPU 30 causes selecting buttons including choices of "next page", and "no next page" to be displayed in the displaying unit 16 (S50). The user can select either of the selecting buttons "next page", and "no next page" displayed in the displaying unit 16. The CPU 30 monitors whether a selecting button has been selected by the user (S52). If either one of the selecting buttons has been selected by the user (YES in S52), the CPU 30 ends the foregoing page scanning and storing process for the currently processed one page, and the process proceeds to S14 of FIG. 6.

In S14 of FIG. 6, the CPU 30 verifies whether a next page exists. In the case of YES in S14, the CPU 30 performs the page scanning and storing process for the document in the next page. By contrast, in the case of NO in S14, the CPU 30 changes the scan number i to equal to 0 (i=0) (S16). The scan number "i" represents the image data to be the process subject of the processes performed by the CPU 30 in S18 through S24. For example, in the case where the scan number i is equal to 0, the image data corresponding to the scan number "0" in the image data administration table 60 becomes the process subject.

Based on the image data administration table 60, the CPU 30 verifies whether the attribute 66 corresponding to the scan number "i" is "normal" (S18). In the case of YES in S18, the CPU 30 performs a page number extracting process (S20). By contrast, in the case of NO in S18, the CPU 30 performs a contents table/index information extracting process (S22).

Figure 9:
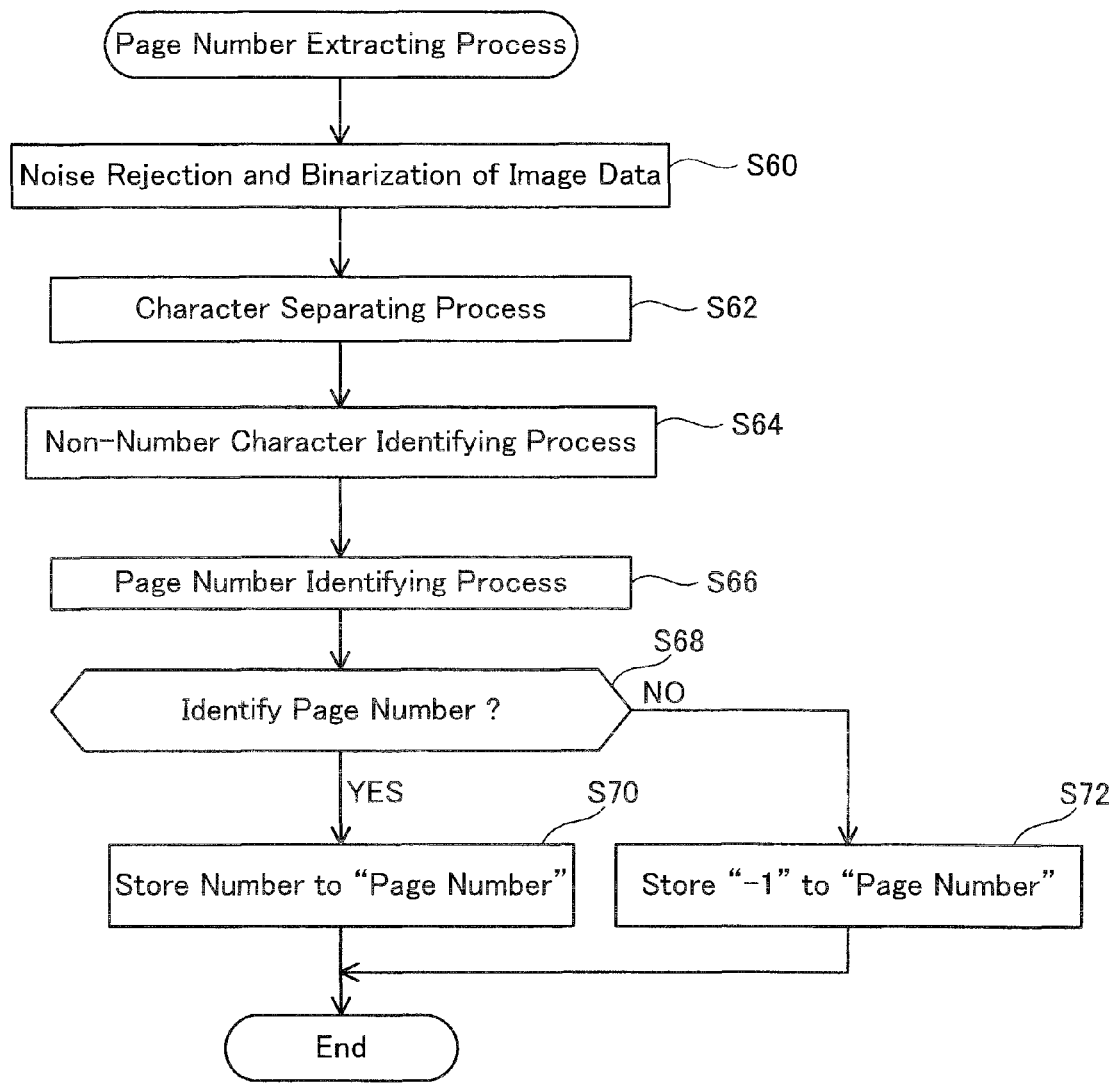
FIG. 9 shows a page number extracting process executed by the CPU.
Figure 10:
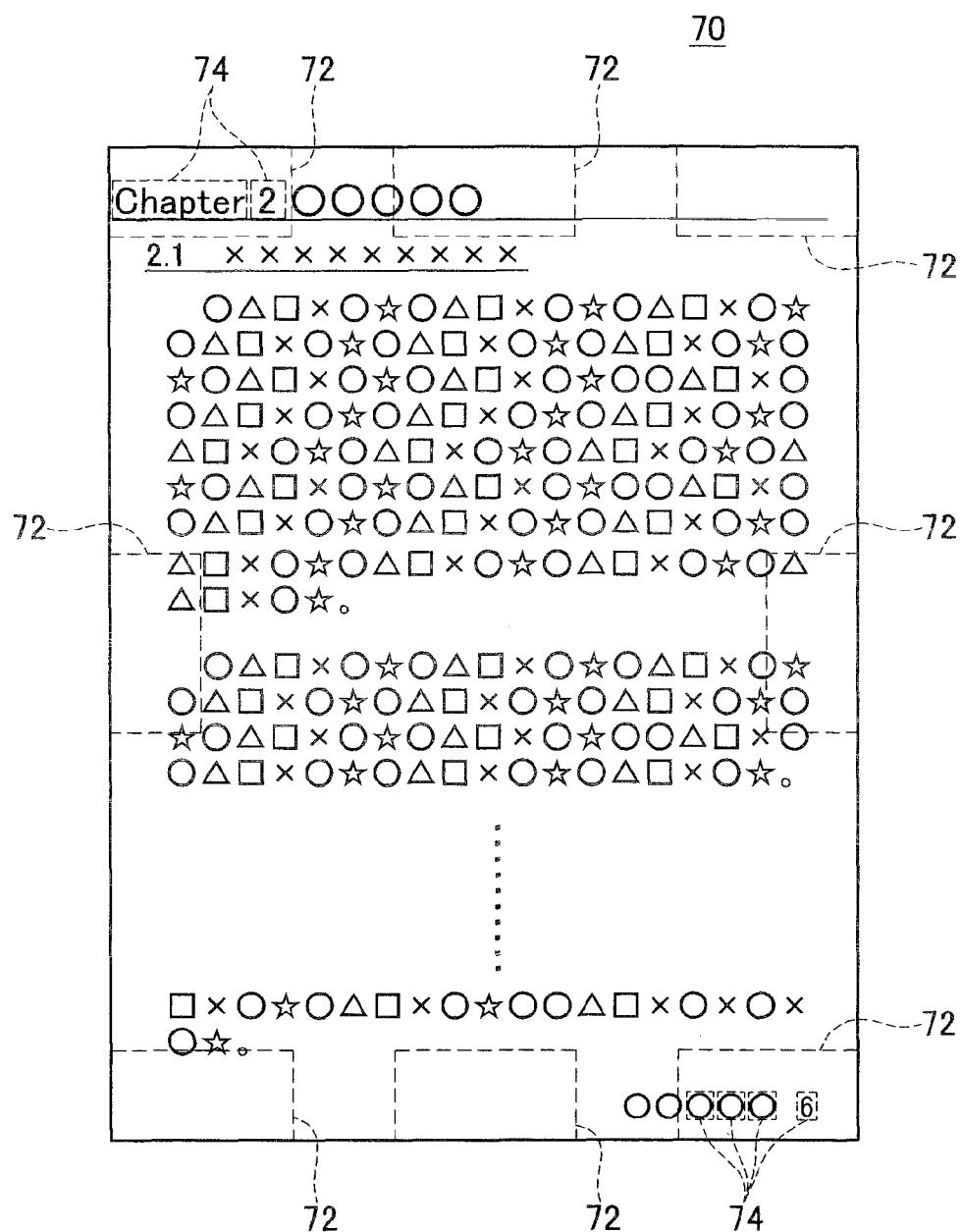
FIG. 10 shows an example of a predetermined page number search area in one page of image data.

As shown in FIG. 9, the CPU 30 performs the page number extracting process in accordance with the programs included in the character recognition program 40 and the page information extracting program 44 of the ROM 32. The CPU 30 performs noise rejection and binarization of the image data corresponding to the scan number "i" (S60). The CPU 30 performs a character separating process to separate into characters each character string contained in a predetermined page number search area of the image data (S62). As shown in FIG. 10, in a normal page 70, a number corresponding to the page number is frequently included in one of a plurality of areas 72 delineated by the broken lines in FIG. 10. The CPU 30 searches for the number corresponding to the page number only in the plurality of areas 72 of FIG. 10. As a result, the time for searching for the number corresponding to the page number can be reduced compared to the case where the entire area of a whole page of image data is to be searched. Further, the frequency with which numbers other than the page number are detected can thereby be reduced. The accuracy of the search for the number corresponding to the page number can be improved. As shown in FIG. 10, in a character separating process, the CPU 30 identifies a plurality of areas 74 that is included in each of the area 72. Each area 74 is an area for one or more characters in character strings within the respective area 72.

The CPU 30 performs a character identifying process to identify numbers and specific non-number characters from among the characters separated in the character separating process (S64). In the character identifying process, the CPU 30 identifies the numbers and specific non-number characters by searching the areas 72 for the characters corresponding to character shape data included in the character recognition program 40 of the ROM 32. In the character shape data, numbers are displayed in a plurality of font types, such as Arabian numerals, etc., that are utilized as numbers for representing normal page numbers. The specific non-number characters consist of symbolic representations. The following are included in the specific non-number characters: ",", "-", and ".", etc. As a result, the character shape data that forms the character recognition subject includes only numbers and predetermined symbols, and does not include letters of the alphabet, hiragana, katakana, Chinese characters, etc. Further, the numbers included in the character shape data may be only the ten numbers from "0" to "9". The CPU 30 performs a page number identifying process for identifying a number corresponding to a page number (S66). In the page number identifying process, the CPU 30 identifies the page number in accordance with number identification rules (FIGS. 16 and 17) for numbers representing page numbers that are included in the page information extracting program 44 of the ROM 32. The number identification rules will be described later in detail.

The CPU 30 verifies whether a number corresponding to a page number could be identified by the process of S66 (S68). In the case of YES in S68, the CPU 30 stores the identified number in the page number 68 of the image data administration table 60 (S70), and the page number extracting process ends. By contrast, in the case of NO in S68, the CPU 30 stores "−1" in the page number 68 of the image data administration table 60 (S72), and the page number extracting process ends.

Figure 11:
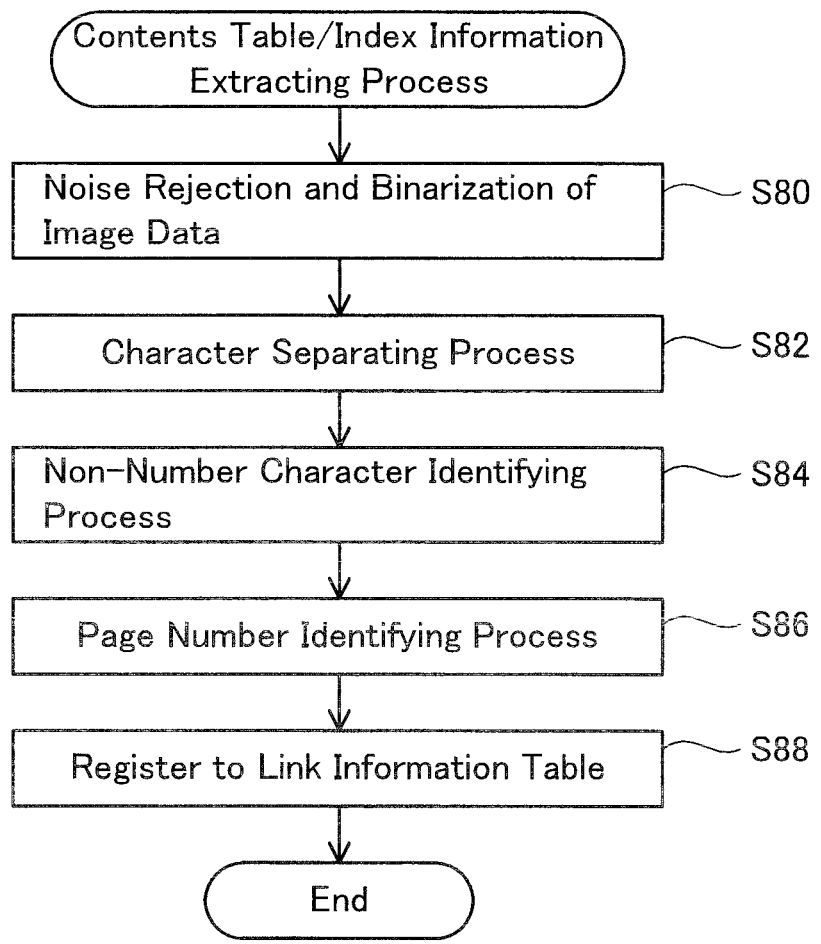
FIG. 11 shows a process sequence of a contents table/index information extracting process executed by the CPU.
Figure 13:
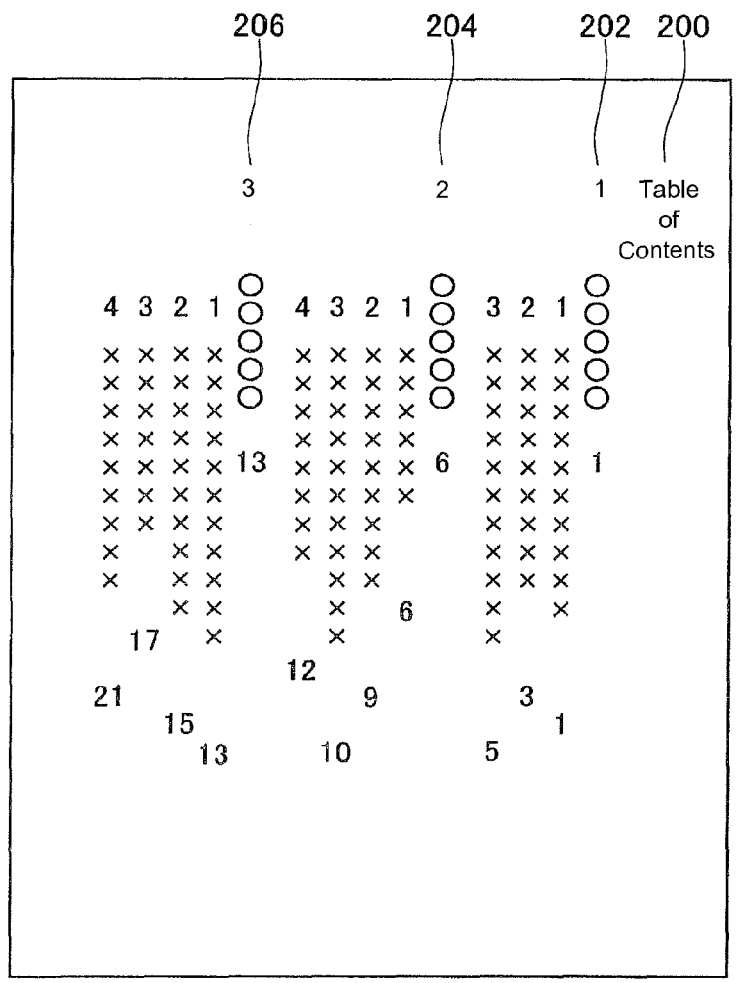
FIG. 13 shows an example of another contents table page.

As shown in FIG. 11, the CPU 30 performs a contents table/index information extracting process in accordance with the programs included in the character recognition program 40 and the content information extracting program 42 of the ROM 32. The CPU 30 performs the process of S80, which is identical to the process in S60 of FIG. 9. The CPU 30 performs a character separating process to separate the characters included in the entire area of one page of image data (S82). Examples of contents table pages are shown in FIG. 12 and FIG. 13. Moreover, FIG. 13 is an example of a Japanese language contents table page. The Chinese characters 200 mean "table of contents", The Chinese characters 202 mean "Chapter 1", the characters 204 mean "Chapter 2", and the characters 206 mean "Chapter 3". An example of an index page is shown in FIG. 14. As shown in FIGS. 12 to 14, unlike the normal page as shown in FIG. 10, the number corresponding to the page number in the contents table page and the index page is not always placed within a specific position in the page. As a result, the CPU 30 performs the character separating process for the entire area of the one page of image data. The CPU 30 then performs the process of S84, which is identical to the process in S64 of FIG. 9.

The CPU 30 performs a page number identifying process for identifying a number corresponding to a page number (S86). In the page number identifying process, the CPU 30 identifies the page number in accordance with the number identification rules (FIGS. 16 and 17) that are stored in the page information extracting program 44 of the ROM 32. The number identification rules will be described in detail later. In S86, the CPU 30 identifies a coordinate or an area of the number corresponding to the page number within the page of the image data. The CPU 30 records information concerning the image data for which the number corresponding to the page number could be identified in the link information temporary storing area 52 of the RAM 34 (S88).

Figure 15:
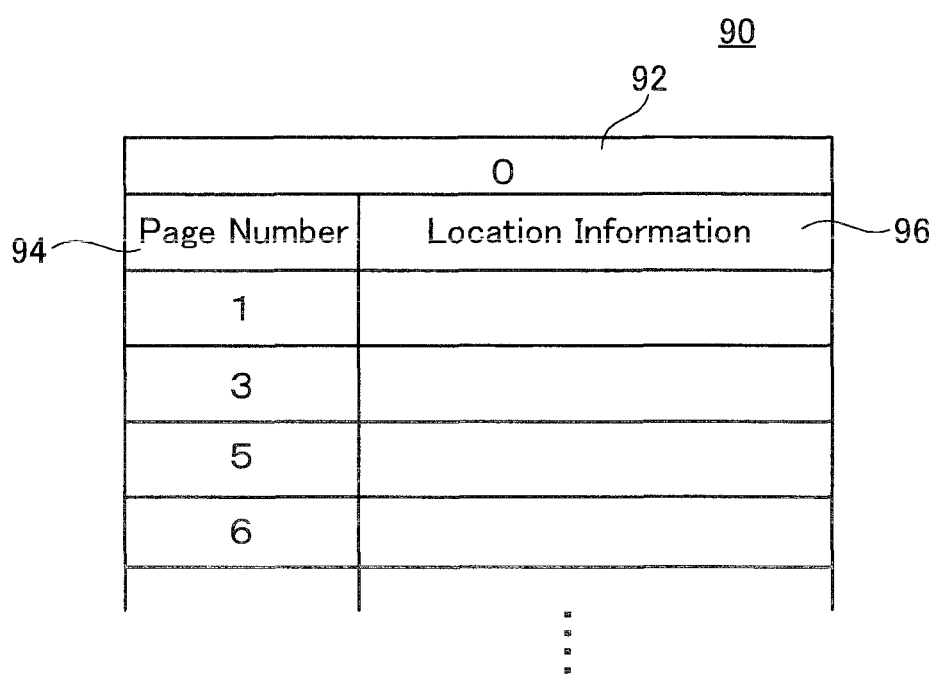

The link information temporary storing area 52 of the RAM 34 is capable of storing a link information table 90. As shown in FIG. 15, the link information table 90 is capable of recording a scan number 92, a page number 94, and location information 96. The scan number 92 is stored in the image data administration table 60 in association with the image data on which the contents table/index information extracting process was performed. The numbers identified in S86 of FIG. 11 are recorded in the columns of the page number 94. Location information (for example, coordinate or area of the number) of the numbers identified in S86 of FIG. 11 is recorded in association with the page numbers 94 in the columns of the location information 96. In S88 of FIG. 11, for image data in which a number corresponding to a page number could be identified, the CPU 30 registers the number corresponding to the page number and the location information of that number in the link information table 90, and ends the contents table/index information extracting process.

The number identification rules that are used by the CPU 30 in the page number identifying process performed by the CPU 30 in S66 of FIG. 9 and S86 of FIG. 11 will now be described. FIGS. 16 and 17 show an identification table 100 in which identification rules 102 for numbers representing page numbers and an application example 104 are written. In accordance with the rules in the identification table 100, the CPU 30 identifies a number included in the page described by the image data as the page number. In the application of each identification rule, the page number is determined correspondingly to the attributes of the page. This may be expressed as that, in addition to the type of identification rule to be applied in the page number identifying process, the page number is determined depending on whether the attribute of said page is "contents table page", "index page" or "normal page". In the identification table 100, unless specifically described otherwise, a number string means one number or two or more continuous numbers. An identification rule (1) is a rule to be applied if a non-number character is present within a predetermined first length in front of and/or behind the number string. According to the identification rule (1), in the case where the number string is included in the image data having the attribute of contents table page or index page, the CPU 30 does not identify the number string as the page number. In this application, the term "the CPU 30 does not identify the number string as a page number" may be represented "the CPU 30 disregards (prohibits) the number string as a page number". For example, the number strings included in "Chapter 1", etc. in FIGS. 12 and 13 are not identified as number strings corresponding to a page number. When the number string is included in image data having the attribute of normal page, the CPU 30 does not identify the number string as a page number in the case where the non-number character included therein is a non-number character other than "-" (a hyphen). Furthermore, the CPU 30 applies one of the identification rules (2) to (4) in the case where the non-number character is a hyphen, and the hyphen is present both in front of and behind the number string. For example, the number "2" included in the string "Chapter 2" in FIG. 10 is not identified as a number string corresponding to a page number.

An identification rule (2) is to be applied if a non-number character other than "," (a comma) is included between two or more numbers. According to the identification rule (2), the CPU 30 does not identify the number string as the page number regardless of the attribute of the image data in which the number is included. For example, the number strings included in the section headings "1.1", etc. in each chapter in FIG. 12 are not identified as number strings corresponding to page numbers.

An identification rule (3) is to be applied if the number string has not been identified as not being a page number in the identification rules (1) and (2), and a comma is included between a first number and a second number. According to the identification rule (3), regardless of the attribute of the image data in which a number string is included, the CPU 30 identifies the number string as a page number, if the below conditions are met: an interval between the comma and a number located in front of the comma and an interval between the comma and a number located behind the comma is equal to or less than a predetermined second length; an interval between the numbers included in a first number is within a predetermined third length in the case where two or more numbers are included in the first number; and an interval between the numbers included in a second number is within the predetermined third length in the case where two or more numbers are included in the second number. By contrast, in the case where the above conditions are not met (i.e., the interval between the comma and the number located in front of the comma and the interval between the comma and the number located behind the comma exceeds the predetermined second length; the interval between the numbers included in the first number is within the predetermined third length in the case where two or more numbers are included in the first number; and the interval between the numbers included in the second number is within the predetermined third length in the case where two or more numbers are included in the second number), the CPU 30 identifies the number string in accordance with the attribute of the page in which the number string is included. Specifically, when the number string is included in image data having the attribute of a contents table page or a normal page, the CPU 30 does not identify the number string as the page number. When the number string is included in image data having the attribute of an index page, the CPU 30 identifies the first number and the second number of the number string as each being the page number. For example, in the number string "23, 33, 70", etc. in FIG. 14, "23, 33, 70" are identified as page numbers respectively.

An identification rule (4) is to be applied if the number string has not been identified as not being the page number in either of the identification rules (1) and (2) and a comma is not included in the number string. According to the identification rule (4), regardless of the attribute of the image data in which the number is included, the CPU 30 identifies the number string as corresponding to a page number in the case where an interval between the numbers is within the third length. By contrast, in the case where the interval between the numbers is a fourth length that is greater than the third length, and the length of the numbers separated by the fourth length is less than or equal to the third length, the CPU 30 does not identify the number string as corresponding to a page number in the case where the number string is included in image data having the attribute of a contents table page or a normal page. On the other hand, in the case where the number string is included in image data having the attribute of an index page, the CPU 30 identifies each of the numbers separated by the fourth length as page numbers.

By utilizing the identification rules (1) to (4), it is possible to reduce the likelihood that a number string that does not correspond to a page number will be wrongly identified by the CPU 30 as a number string corresponding to a page number.

In FIG. 6, when the page number extracting process of S20 or the contents table/index information extracting process of S22 ends, the CPU 30 adds 1 to the scan number "i" (S24). The CPU 30 compares the scan number "i" with the scan number 62 of the image data administration table 60, and determines whether the page number extracting process or the contents table/index information extracting process has been executed for all the scanned pages (S26). In the case of NO in S26, the process proceeds to S18. By contrast, in the case of YES in S26, the CPU 30 performs a page number correcting process (S28).

Figure 18:
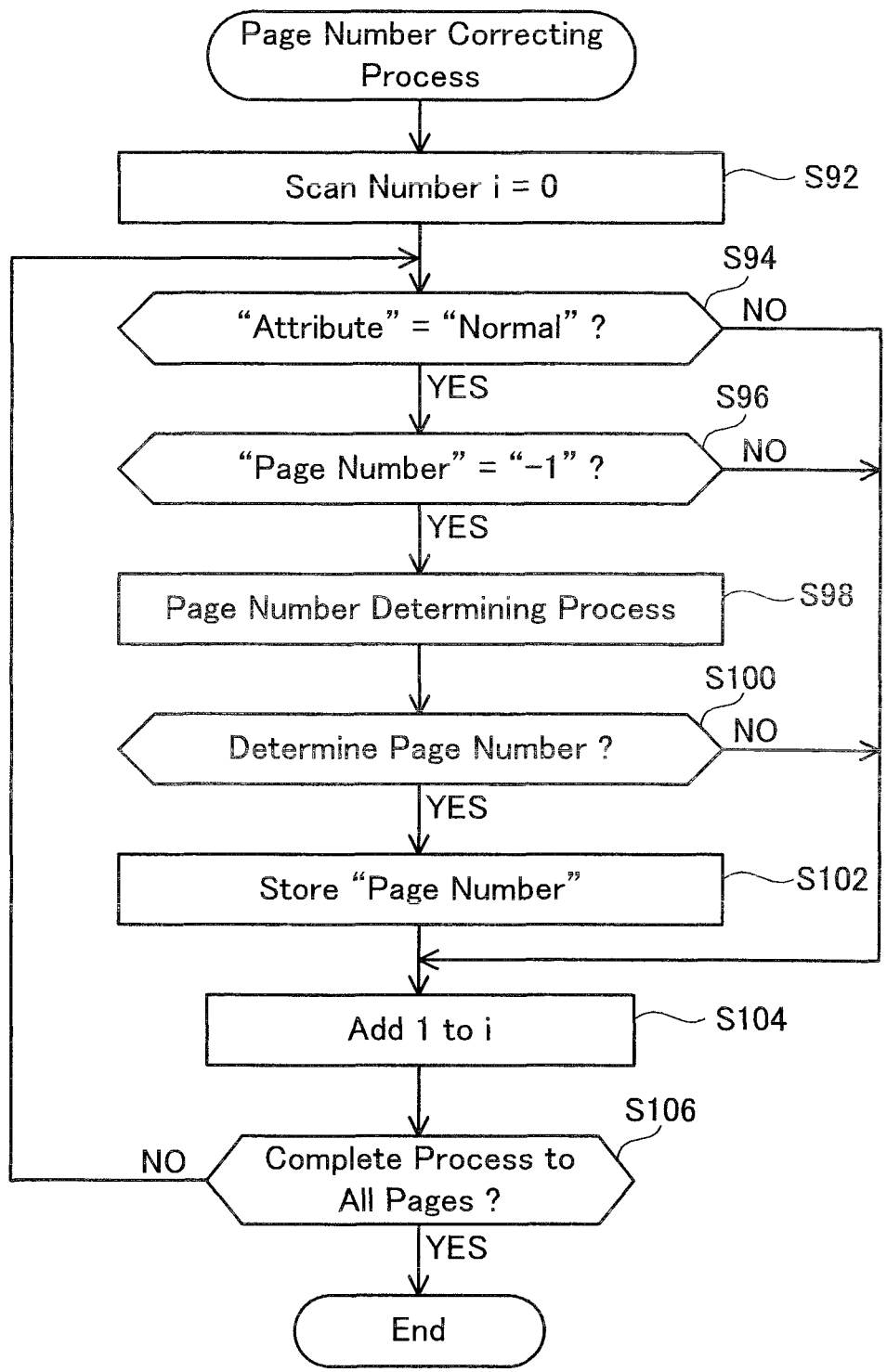
FIG. 18 shows the process sequence of a page number correcting process executed by the CPU.

As shown in FIG. 18, the CPU 30 changes the scan number "i" to equal to "0" (i=0) (S92). The CPU 30 verifies the image data administration table 60, and verifies whether the attribute 66 of the image data corresponding to the scan number "i" is "normal" (S94). In the case of NO in S94, the process proceeds to S104. In the case of YES in S94, the CPU 30 verifies whether the page number 68 corresponding to the scan number "i" is "−1" (S96). In the case of NO in S96, the process proceeds to S104. In the case of YES in S96, the CPU 30 identifies a number corresponding to a page number of the image data from the page number 68 of the image data that is registered in the image data administration table 60 in front of and/or behind the scan number "i" (S98).

In particular, in the case where the page number 68 is identified from the scan numbers in front of and behind the scan number "i", i.e. from a scan number "i−1" and a scan number "i+1", the CPU 30 determines an integral number between the numbers recorded in the two page numbers 68 to be the number corresponding to the page number of the image data of the scan number "i". Alternatively, in the case of page numbers corresponding to a plurality of scan numbers that sequentially continues in front of the scan number "i", for example, "11, 12, 13, 14", the number corresponding to the page number of the image data of the scan number "i" is determined to be "15" (i.e. a subsequent number of the sequence). Further, in the case of a page number corresponding to a plurality of scan numbers that sequentially continues behind the scan number "i", for example, "11, 12, 13, 14", the number corresponding to the page number of the image data of the scan number "i" is determined to be "10" (i.e. a preceding number of the sequence).

The CPU 30 verifies whether the page number has been determined in S98 (S100). In the case of NO in S100, the process proceeds to S104. In the case of YES in S100, the CPU 30 records the number corresponding to the determined page number in the page number 68 of the image data administration table 60 (S102), and the process proceeds to S104. In S104, the CPU 30 adds 1 to the scan number "i". The CPU 30 compares the scan number "i" with the scan number 62 of the image data administration table 60, and determines whether the page number extracting process or the contents table/index information extracting process has been executed for all the scanned pages (S106). In the case of NO in S106, the process proceeds to S94. In the case of YES in S106, the page number correcting process ends.

Figure 19:
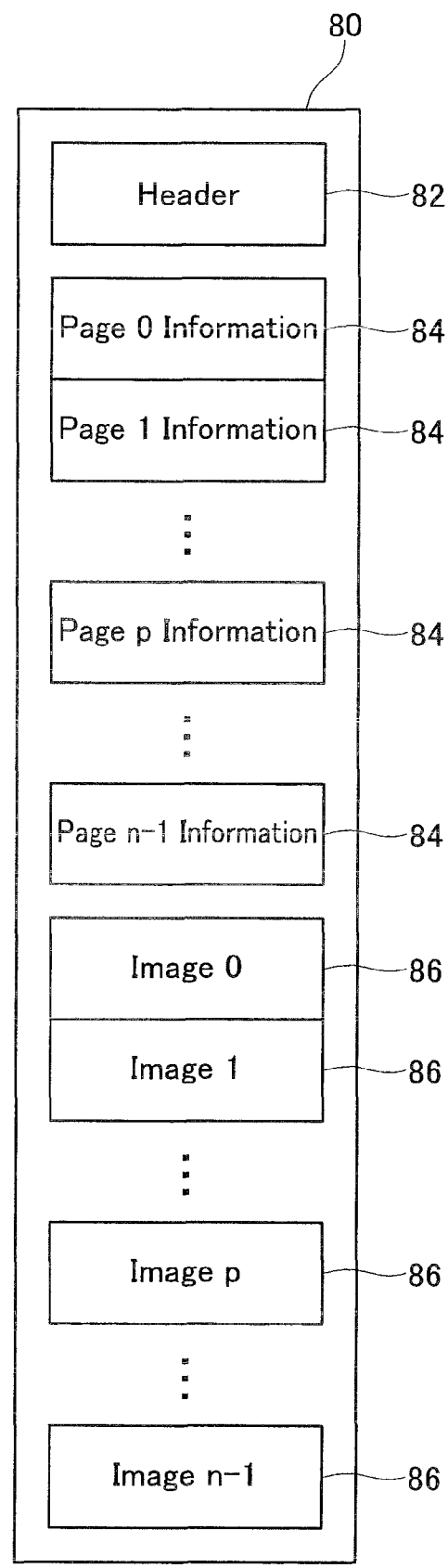
FIG. 19 shows an example of a hyperlink structure file 80 generated by the CPU.

Returning to FIG. 6, when the page number correcting process of S28 ends, the CPU 30 performs a hyperlink process (S30). FIG. 19 is an example of a file 80 of hyperlink structure generated by the CPU 30 using the hyperlink process. The CPU 30 generates the file 80 in the link information temporary storing area 52 of the RAM 34. FIG. 19 shows the case where the file 80 of the hyperlink structure has been generated for a document whose page number is page "n". The file 80 is generated in a file format that has a hyperlink structure, such as for example PDF, MHTML (MIME Encapsulation of Aggregate HTML), etc.

Figure 20:
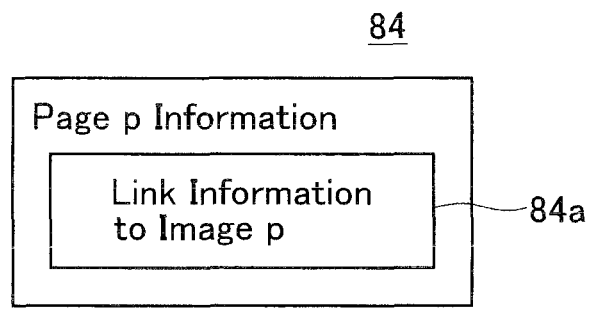
FIG. 20 shows contents of page information in the case of a normal page.
Figure 21:
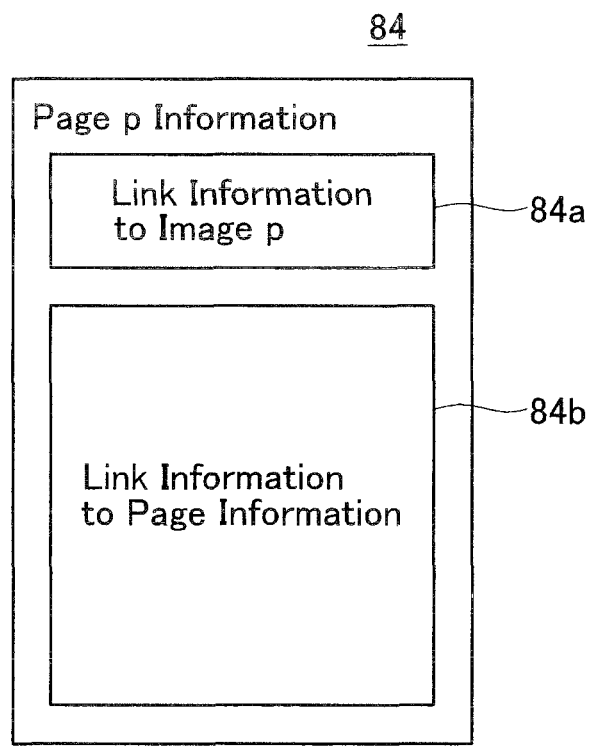
FIG. 21 shows contents of page information in the case of a contents table page or an index page.
Figure 22:
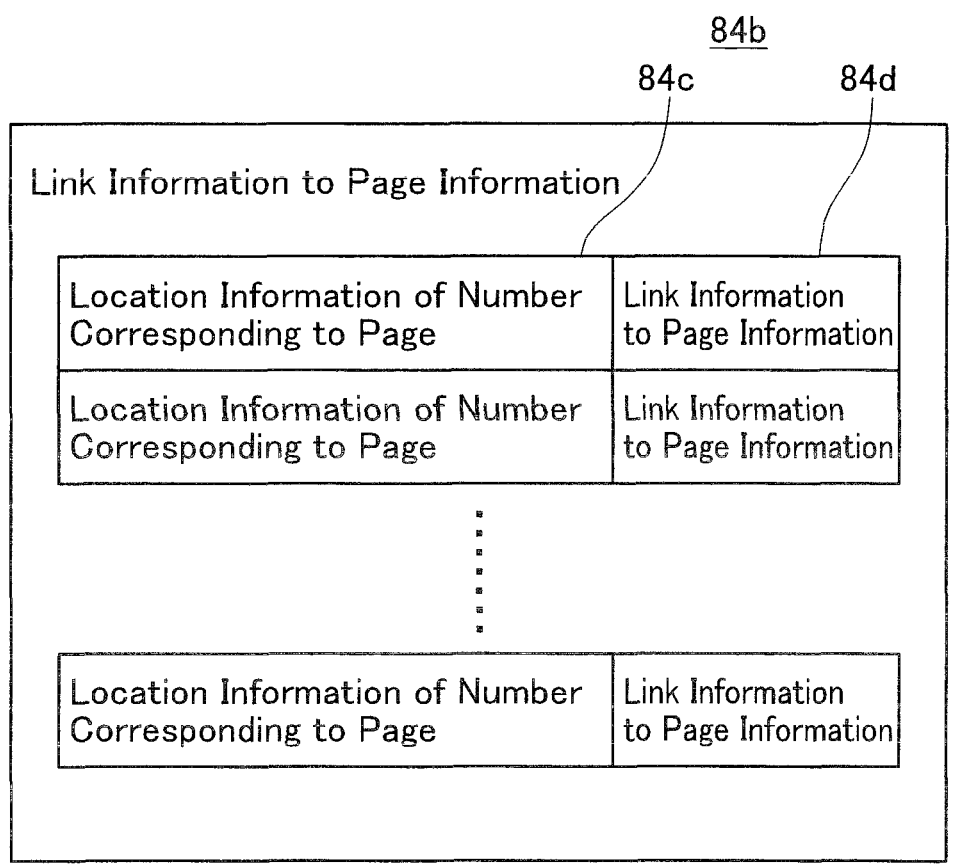
FIG. 22 shows the contents of link information.

The file 80 comprises a header 82, a plurality of sets of page information 84, and a plurality of sets of image data 86. Page information of each page (from page 0 to page n−1) is described in the file 80. The page information 84 and the image data 86 correspond in an one-to-one relationship. FIG. 20 shows the contents of the page information 84 in the case where an image p is a normal page. In the case where the image p is a normal page, link information 84a to the image p is described in the page information 84. FIG. 21 shows the contents of the page information in the case where the image p is a contents table page or an index page. In the case where the image p is a contents table page or an index page, the link information 84a to the image p as well as link information 84b to the predetermined page information 84 is described in the page information 84. FIG. 22 shows the contents of the link information 84b. The link information 84b is an association of location information 84c of the number string corresponding to the number page and link information to the page information 84d.

The following are described in the location information 84c of the number string corresponding to the page number: the number strings recorded in the link information table 90 in S88 of FIG. 11, and the location information of those number strings. That is, in the case where ten number strings have been recorded in the link information table 90, link information 84b that includes ten items of location information 84c is generated. Link destination page information 84d is associated with each item of location information 84c. The link information 84d to the page information is information for linking the number string described in the associated location information 84c with the page information of the same page number.

Next, the method generating the file 80 by the CPU 30 will be described. The CPU 30 writes the image data 86 stored in S46 of FIG. 7 in the file 80. The CPU 30 assigns, to each item of image data 86, a number that is the same as the scan number 62 recorded in the image data administration table 60 associated with the image data 86. Hereinafter, a description is given in which the assigned number is "p" (i.e. image p).

The CPU 30 generates the page information 84 for each item of image data 86. The CPU 30 verifies the attribute 66 that is recorded in the image data administration table 60 in association with the scan number 62 that is identical to the number "p" assigned to the image data 86. In the case where the attribute 66 is "normal", the CPU 30 generates the page information by writing the link information 84a to the image p into the page information 84. By contrast, in the case where the attribute is "contents table" or "index", the CPU 30 writes the link information 84a to the image p into the page information 84. Further, the CPU 30 writes, from the link information table 90 in which the scan number 92 is "p", the page number 94 and the location information 96 into the location information 84c for each of the page numbers 94.

Next, the CPU 30 searches in the image data administration table 60 for the page number 68 that is identical to the page number 94 in the location information 84c, and identifies the scan number 62 (the scan number "p") recorded in the image data administration table 60 in association with the page number 68. The CPU 30 writes the link information 84d linking to the page information 84 of the identified scan number "p" in association with the location information 84c. The page information 84 is generated by the CPU 30 performing the process of writing the link information 84d for all of the location information 48c. The CPU 30 generates the file 80 by performing the above process for all of the image data 86.

Returning to FIG. 6, when the hyperlink process of S30 ends, the file 80 is generated, and the CPU 30 sends the file 80 to an external terminal such as a PC, etc. via the network I/F 24 (S32). The CPU 30 may store the generated file 80 in the RAM 34. Since the file 80 has been generated, the CPU 30 deletes the data that was temporarily stored in the RAM 34 (S34), and ends the process.

The user displays on the PC the image data that corresponds to the contents table page included in the file 80 sent from the scanner 10 to the PC. The image of FIG. 12 or FIG. 13 is displayed on the displaying unit of the PC. In a case where the user verifies the contents table and wishes to display the image data corresponding to Chapter 2 on the displaying unit of the PC, the user clicks on the number corresponding to the page number "6" of Chapter 2 on the contents table page. The PC searches in the file 80 for the page information 84 that is hyperlinked to the number "6" based on the location information 84c and the link information to the page information 84d included in the page information 84 of the file 80. The PC is capable of displaying, in the displaying unit, image data corresponding to the page information 84 that has been a hit in the search. The user does not need to display the image data of a plurality of normal pages one at a time in the displaying unit, and search the page corresponding to image data that has the desired contents.

In the scanner 10, a hyperlink is generated at where the number of the contents table page and/or index page is located in order to link to the data of the normal page that includes the page number that is identical with this number. Using this data of hyperlink structure, the user can easily jump to a display of the data of a page that has desired contents from the contents table page and/or index page. That is, when the contents table page and/or index page are being displayed, the user can perform a predetermined operation on the number corresponding to a page number of a page that has desired contents. In this case, the hyperlink functions, and the normal page having the page number identical to the number that had the operation performed thereon is displayed. The user can thereby easily see the data of the desired page.

The location of the number identified in S86 of FIG. 11 may be the location of the identified number, may be the location of a character string corresponding to the identified number (for example, a caption of the contents table page corresponding to the identified number, a word included in an indexed subject in the index page, etc.), or may be an area containing the location of the identified number and the location of a character string corresponding to the identified number (for example, an area in the same row as the number string in the case where the contents table or the index is written horizontally, and an area in the same column as the number string in the case where the contents table or index is written vertically). Further, the location of the identified number may be included or excluded. In addition, the term "hyperlink" refers to "an instruction (information) commanding the computer to display the data of a normal page that has a page number identical with that number in the case where a predetermined operation (clicking, for example) is performed on a number on the page when the contents table page and/or index page is displayed on the displaying unit".

In the above embodiment, the scanner 10 identifies numbers corresponding to page numbers from data of a plurality of normal pages. According to this configuration, the user does not need to designate a number corresponding to the page number from data of the plurality of normal pages.

Further, according to the scanner 10, it is possible to identify a number from the contents table page and/or the index page. In addition, the character shape data utilized for the character identifying process (S64 in FIG. 9) includes only a number from 0 to 9, and a symbol such as a comma, a hyphen, etc. but does not include letters of the alphabet, hiragana, katakana, or Chinese characters. Since the number of character shape data is composed of the smallest number of candidates as possible, the character identifying process can consequently be performed in a short time.

In almost all normal pages, the page number is near an outer periphery of the page (a plurality of areas 72 in FIG. 10) irrespective of the type of document. In the page number extracting process in FIG. 9, the scanner 10 searches for a number corresponding to a page number only in the plurality of areas 72 of FIG. 10. As a result, it is possible to reduce the time for identifying the number corresponding to the page number.

There may be a case that a number corresponding to a page number of a normal page cannot be identified (NO in S68 of FIG. 9). In the case where a document is scanned and image data is generated, image data that does not include the number corresponding to the page number may be generated due to a damage such as ripping and fading, or contamination in the document to be scanned. In such a case, the number corresponding to the page number cannot be identified in the data. However, the page number of the aforesaid image data may be determined from the page numbers that are included in the other image data that has been generated before and after the aforesaid image data. For example, assume a case in which the numbers corresponding to the page numbers have been identified for pages 1 to 8 from the data for the plurality of normal pages, and the numbers corresponding to the page numbers have been identified for page 10 and onwards from the data of normal pages, but the number corresponding to the page number could not be identified for one page from the data of one normal page that had been generated in the sequence of generating the aforesaid image data for 1 to 8 and 10 and on pages. In this ease, by using the progression relationship of the page numbers, the scanner 10 may determine that the data of the normal page in which the page number had not been identified is the data of page 9. It is thereby possible to determine a posteriori the page number for the data of a normal page in which the page number could not have been identified in the page number identifying process (S66 of FIG. 9).

In the above embodiment, data for a plurality of normal pages are arranged sequentially. In this case, when there is data of a normal page in which a number corresponding to a page number can not be identified, the scanner 10 may determine an integral number between numbers corresponding to two page numbers identified from the data of normal pages which are respectively arranged in front of and behind the data of this normal page whose page number is unknown to be the number corresponding to the page number included in the data of this normal page (S98 in FIG. 18). According to this configuration, it is possible to determine a posteriori the page number corresponding to data of a normal page in which the page number could not have been identified in the page number identifying process (S66 of FIG. 9).

The data of page may also include a number aside from the number corresponding to the page number. In the case where the scanner 10 identifying in the number the page number extracting process in FIG. 9, there may be undesirable occasions in which the scanner 10 identifies numbers other than the number corresponding to the page number. In the above embodiment, the scanner 10 identifies the page number in accordance with number identification rules (FIGS. 16 and 17). As a result, it is possible to reduce the likelihood that a number string that does not correspond to a page number will be wrongly identified by the scanner 10 as a number string corresponding to a page number.

On a condition that, in a number string including two or more numbers, an interval between the numbers is equal to or less than a predetermined first length (that is, if the two or more numbers are close enough to each other to be regarded as digits in one number), the scanner 10 may identify the number string as a number corresponding to a page number. For example, in the case where a keyword "ZZZ" is written in a plurality of pages (for example, in the 13th page and the 24th page) in the index pages, the numbers corresponding to the page numbers are often written in an aligned manner in the index pages, such as "13 24" as page numbers corresponding to "ZZZ". In the scanner 10, in the case where the interval between the numbers in a number string including two or more numbers is equal to or less than the predetermined first length, the numbers are identified as digits in one number corresponding to the page number for one page. According to the scanner 10, it is possible to identify, for numbers written as "13 24", "1" and "3" are determined as digits included in one number "13", "2" and "4" are determined likewise as "24". Furthermore, the number string is determined as representing separate pages "13" and "24".

In a number string including a first number including at least one number (such as having at least one digit), a second number including at least one number (such as having at least one digit), and a comma located between the first number and the second number, the scanner 10 may identify the number string as a number corresponding to the page number of one page on the condition that an interval between the numbers of the first number is equal to or less than the first length and an interval between the numbers of the second number is equal to or less than the first length, and that an interval between the comma and the number located in front of the comma, as well as an interval between the comma and the number located behind the comma is equal to or less than a predetermined second length. The second length may differ from the first length, or may equally well be the same as the first length.

For example, in the case where the page number is 1000 or above, this page number may be written as "1, 000". In this case, "1" is determined as the first number, and "000" is determined as the second number. In the scanner 10, in the case where the interval in the second number "000" in front of the comma and behind the comma respectively is equal to or less than the first length, and the interval between the comma and the first and second numbers located in front of and behind the comma are each equal to or less than the second length, the number string including the first and second numbers as a whole (i.e., "1000") will be identified as corresponding to the page number for one page. Numbers that exceed the thousands column, such as "1, 000" and the like can thus be identified as numbers corresponding to page numbers.

Further, in the scanner 10, in order to identify the number string corresponding to the page number included in the image data, the CPU 30 may recognize only a limited set of characters, such as numbers and specific non-number, symbolic characters. In this configuration, the CPU 30 can generate the file 80 without recognizing all the characters included in the image data. The hyperlink structure file 80 can thereby be generated without using a high-precision character recognition means.

(Variants)

(1) In the above embodiment, when one page has been scanned by the scanning unit 20 of the scanner 10, the attribute of the page, i.e. "contents table", "index", or "normal" is selected by the user. However, the attribute of the page may be selected by the user when all the pages of the document have been scanned by the scanning unit 20. Alternatively, the scanner 10 may identify the attribute of the page, i.e. "contents table", "index", or "normal" by means of character recognition for the entire area of the generated image data or for a specific area thereof.

(2) Further, in the above embodiment, in the case where a number corresponding to a page number of a contents table page or an index page is to be identified, the CPU 30 performs the identification in accordance with the identification rules (1) to (4). However, in the case where, the number string included in the contents table page or index page includes (a) only one number, or (b) two or more numbers and has the interval between the numbers equal to or less than a third length, the CPU 30 may identify the number string as a number string corresponding to the page number. The time for the CPU 30 to perform the contents table/index information extracting process can thereby be reduced. In the case where the user displays the contents table page or index page in the displaying unit of the PC and selects (clicks on) the desired page number, a number string that does not correspond to the page number is almost never selected, and the user will not be confused by a normal page having a page number corresponding to the number string being hyperlinked at the location of a number string that does not correspond to the page number.

(3) Further, a hyperlink may be generated in the contents table page or index page for an area in which the number strings detected to be the page numbers are in the same line (in the case where the contents table or index page is horizontal text (for example, FIGS. 12 and 14), this is an area where the number strings are in the same row, and in the case where the contents table or index page is vertical text (for example, FIG. 13), this is an area where the number strings are in the same column).

(4) Further, in the above embodiment, the hyperlink structure file 80 is generated by the CPU 30 of the scanner 10. However, the file 80 may be generated by an external CPU such as a PC or the like connected to the scanner 10. In this case, the character recognition program 40, the content information extracting program 42, the page information extracting program 44, and the link generating program 46 may be stored in the PC. By executing these programs, the PC can generate the hyperlink for image data read by the scanner 10 and received by the PC.

(5) Further, in the above embodiment, the file 80 is one file. However, the file 80 may equally well be a plurality of files. For example, each item of image data and the data of the contents table page and/or index page may be separate files (for example, conventional HTML format files and image data files).

(6) In the above embodiment, the hyperlink structure data is generated as a set of data of image data obtained by scanning a document. However, the set of data may equally well be text format data generated using word processing software or the like.

(7) The contents table page and/or index page are pages that include the contents of a contents table page and/or an index page, but this concept also includes pages including contents other than the contents table page and/or index page. A normal page is a page that does not include the contents of the contents table page and/or index page.

(8) In the above embodiment, the scanner 10 identifies a number corresponding to a page number of a normal page. However, the scanner 10 may equally well comprise an unit allowing the user to designate numbers corresponding to page numbers for data of each of a plurality of normal pages.

What is claimed is:

1. A data generating device comprising:
a scan data acquiring unit configured to acquire scan data being image data obtained by scanning documents, the scan data including first data corresponding to a contents table page and/or second data corresponding to an index page, and a plurality of third data corresponding to a plurality of normal pages, the third data of each normal page including a page number; and
a processor configured to execute:
identifying the first data and/or the second data from the scan data;
identifying a number included in the first data and/or a number included in the second data, and identifying a first position at which the identified number included in the first data is located in the first data and/or a second position at which the identified number included in the second data is located in the second data;
searching specific third data, from the plurality of third data, for a number coinciding with the identified number included in the first data as a page number and/or a number coinciding with the identified number included in the second data as a page number; and
generating data of hyperlink structure from the scan data by generating a hyperlink,
wherein the data of hyperlink structure includes:
the first data and/or the second data and the plurality of third data; and
a first hyperlink at a position corresponding to the first position for linking to the specific third data including the number coinciding with the identified number included in the first data as the page number and/or a second hyperlink at a position corresponding to the second position for linking to the specific third data including the number coinciding with the identified number included in the second data as the page number.

2. The data generating device as in claim 1, further comprising:
a page number identifying unit configured to identify a number corresponding to a page number from the third data; and
a storing unit configured to store, for each of the plurality of normal pages, an association of the third data and the number identified from the third data by the page number identifying unit,
wherein the searching unit is configured to search the specific third data associated with the number which coincides with the identified number included in the first data and/or the identified number included in the second data.

3. The data generating device as in claim 2, wherein
each of the number identifying unit and the page number identifying unit is configured to identify a number from the scan data by searching the scan data for a predetermined number.

4. The data generating device as in claim 3, wherein
the page number identifying unit is configured to identify, for each of the plurality of normal pages, the number corresponding to the page number by searching data of a predetermined area in the normal page for the predetermined number.

5. The data generating device as in claim 3, wherein
the page number identifying unit is configured, in a case where a number corresponding to a page number of a specific normal page could not be identified from third data of the specific normal page, to determine the number corresponding to the page number of the specific normal page based on at least one other number that has been identified as corresponding to the page number of at least one other normal page.

6. The data generating device as in claim 5, wherein
the plurality of third data in the scan data is arranged sequentially, and
the page number identifying unit is configured, in the case where a number corresponding to the page number of the specific normal page could not be identified from third data of the specific normal page, to determine the number corresponding to the page number of the specific normal page to be an integral number between two numbers corresponding to page numbers of the normal pages respectively arranged in front of and behind the specific normal page.

7. The data generating device as in claim 3, wherein
each of the number identifying unit and the page number identifying unit is configured, on a condition that an interval between any of adjacent numbers included in a number string including more than two numbers is equal to or less than a predetermined first length, to identify the number string as the number corresponding to the page number.

8. The data generating device as in claim 7, wherein
each of the number identifying unit and the page number identifying unit is configured, on a condition that:
(a) a first number including at least one number, a second number including at least one number, and a comma located between the first number and the second number are included in the number string;
(b) an interval between any of adjacent numbers included in the first number is equal to or less than the first length in a case where the first number includes at least two numbers,
(c) an interval between any adjacent numbers included in the second number is equal to or less than the first length in a case where the second number includes at least two numbers; and
(d) an interval between the comma and a number located in front of the comma as well as an interval between the comma and a number located behind the comma are each equal to or less than a predetermined second length,
to identify the number string as the number corresponding to the page number.

9. The data generating device as in claim 7, wherein
even when the interval between any of the adjacent numbers included in the number string including more than two numbers is equal to or less than the first length, the number identifying unit is configured not to identify the number string as a number corresponding to a page number on a condition that at least one other character is present within a predetermined third length in front of and/or behind the number string.

10. The data generating device as in claim 7, wherein
on a condition that the interval between any of adjacent numbers included in the number string including more than two numbers is equal to or less than the first length and at least one other character is present within a predetermined fourth length in front of and/or behind the number string, the page number identifying unit is configured:
(a) to identify the number string as a number corresponding to a page number on the condition that the at least one other character is a hyphen, and the hyphen is located both in front of and behind the number string, and
(b) not to identify the number string as a number corresponding to a page number on the condition that the at least one other character is a non-number character other than the hyphen, or the at least one other character is the hyphen and the hyphen is located only in front of or behind the number string.

11. The data generating device as in claim 7, wherein
each of the number identifying unit and the page number identifying unit is configured not to identify a number string that includes a non-number character other than a comma between any of adjacent numbers included in the number string.

12. A scanner comprising:
a scanner unit configured to generate scan data by scanning documents; and
a processor configured to execute:
acquiring scan data being image data generated by the scanner unit, the scan data including first data corresponding to a contents table page and/or second data corresponding to an index page, and a plurality of third data corresponding to a plurality of normal pages, the third data of each normal page including a page number;
identifying the first data and/or the second data from the scan data;
identifying a number included in the first data and/or a number included in the second data, and identifying a first position at which the identified number included in the first data is located in the first data and/or a second position at which the identified number included in the second data is located in the second data;
searching specific third data, from the plurality of third data, for a number coinciding with the identified number included in the first data as a page number and/or a number coinciding with the identified number included in the second data as a page number; and
generating data of hyperlink structure from the scan data by generating a hyperlink,
wherein the data of hyperlink structure includes:
the first data and/or the second data and the plurality of third data; and
a first hyperlink at a position corresponding to the first position for linking to the specific third data including the number coinciding with the identified number included in the first data as the page number and/or a second hyperlink at a position corresponding to the second position for linking to the specific third data including the number coinciding with the identified number included in the second data as the page number.

13. A non-transitory computer readable medium storing a computer program, the computer program including instructions for ordering a computer mounted on a data generating device, the instruction ordering the computer to perform:
acquiring scan data being image data obtained by scanning documents, the scan data including first data corresponding to a contents table page and/or second data corresponding to an index page, and a plurality of third data corresponding to a plurality of normal pages, the third data of each normal page including a page number;
identifying the first data and/or the second data from the scan data;
identifying a number included in the first data and/or a number included in the second data and identifying a first position at which the identified number included in the first data is located in the first data and/or a second position at which the identified number included in the second data is located in the second data;

searching specific third data, from the plurality of third data, for a number coinciding with the identified number included in the first data as a page number and/or a number coinciding with the identified number included in the second data as a page number; and generating data of hyperlink structure from the scan data by generating a hyperlink, wherein the data of hyperlink structure includes:

the first data and/or the second data and the plurality of third data; and a first hyperlink at a position corresponding to the first position for linking to the specific third data including the number coinciding with the identified number included in the first data as the page number and/or a second hyperlink at a position corresponding to the second position for linking to the specific third data including the number coinciding with the identified number included in the second data as the page number.

* * * * *